United States Patent Office 3,597,493
Patented Aug. 3, 1971

3,597,493
CONVERSION OF HYDROCARBONS
Vincent J. Frilette, Yardley, and Mae K. Rubin, Bala Cynwyd, Pa., assignors to Mobil Oil Corporation
No Drawing. Continuation of application Ser. No. 494,228, Oct. 8, 1965, which is a continuation of application Ser. No. 142,778, Oct. 4, 1961. This application Jan. 15, 1968, Ser. No. 697,610
Int. Cl. C07c 5/22
U.S. Cl. 260—666                                                    14 Claims

ABSTRACT OF THE DISCLOSURE

Acid mordenite, a crystalline aluminosilicate having a ratio of silicon atoms to aluminum atoms of about 5 to 1 can be used as a catalyst for various hydrocarbon conversion processes, including isomerization of naphthenes.

CROSS REFERENCES TO RELATED APPLICATIONS

This application is a continuation of application Ser. No. 494,228, filed Oct. 8, 1965, which, in turn, is a continuation of application Ser. No. 142,778, filed Oct. 4, 1961, both now abandoned.

FIELD OF INVENTION

The invention relates to various hydrocarbon conversion processes which may be catalyzed by acid mordenite.

DESCRIPTION OF PRIOR ART

This application contains certain claims which have been copied from U.S. Pat. 3,299,153.

SUMMARY OF INVENTION

The invention is directed to a wide variety of hydrocarbon conversion processes, e.g., cracking, reforming, disproportionation, isomerization, alkylation, etc., wherein a crystalline aluminosilicate catalyst is employed. The catalyst is acid mordenite, a crystalline aluminosilicate.

This invention has to do with the catalytic conversion of hydrocarbons and is particularly concerned with carrying out such conversions over a catalytic material of unique capabilities.

Zeolitic materials, both natural and synthetic, in naturally occurring and modified forms have been demonstrated as having catalytic capabilities for hydrogen conversion. Such zeolitic materials are ordered crystalline aluminosilicates having definite crystalline structure within which there are passages, pores, or cavities of definite ranges of size. Since the dimensions of these pores are such as to accept for adsorption molecules of certain dimensions while rejecting those of larger dimension, these materials have been referred to as "molecular sieves" and utilized in many ways taking advantage of these properties.

A newly investigated zeolitic material is mordenite. Mordenite is an ordered crystalline alumino-silicate, having a ratio of silicon atoms to aluminum atoms of about 5 to 1. It occurs naturally and has also been synthesized. It occurs usually as the sodium salt and corresponds to the formula:

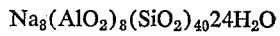

$$Na_8(AlO_2)_8(SiO_2)_{40}24H_2O$$

The ordered alumino-silicate crystalline framework of mordenite differs from that of other known zeolites in that it is composed of chains of 5-membered rings of tetrahedra and its porosity indicates one parallel system of channels having free diameters of the order of 4 A.- to 6.6 A., interconnected by smaller channels, parallel to another axis of the order of 2.8 A. free diameter.

This invention is specifically concerned with various conversions of hydrocarbons in the presence of activated mordenite and its applications to hydrocarbon conversions as its object. Other objects are in part obvious and in part appear hereinafter.

The unique catalyst with which this invention is concerned may be prepared by the activation of naturally occurring mordenite. One method of preparation is to reduce the material to a fine powder, at least passing the standard 200-mesh sieve, and preferably passing 300-mesh or 325-mesh standard sieves, or finer, followed by acid treatment. A specific example of acid treatment is to contact 10 grams of a powdered mordenite passing a 325-mesh sieve with 125 to 200 ml. of 0.1 N HCl for 15 minutes, filter, and repeat, then treat with 125 to 200 ml. of 1.2 N HCl for 15 minutes, and repeat (all at room temperature), followed by rinsing until filtrate shows no acidity. The filter cake, dried at 120° C. and pelleted, will yield about 8 grams of catalytic material.

Such treatment as above outlined will result in an activated mordenite at least 50% of which is in the "H" or acid form. Since the presence of alkaline earth metal ions in the ordered crystalline structure sometimes is found to confer a degree of stability, such materials may be present. If the naturally occurring mordenite contains calcium, as it frequently does, the acid treatment may be so handled as to leave a portion present, or the alkaline earth metal ions may be introduced by base exchange in known manner. However, the amount of calcium or similar substitution should be carefully controlled and held to values such as do not materially alter the conversion capabilities of the catalyst which should be at least 50% in the acid or "H" form.

Also, the material may be treated in known manner to incorporate certain active trivalent metals, such as cerium, lanthanum, iron, and the like, capable of modification of the catalytic reactions.

Similarly, the proportion of aluminum, in the trivalent form, may be increased, with significant alteration in the catalytic activity of the material for many reactions.

Such a catalyst is capable of adsorbing carbon dioxide to the extent of about 10% of its own weight. It is further and most strikingly characterized by a capability of converting normal hexane to the extent of about 20 weight percent at a temperature of 240° C. (465° F.) and a partial pressure of about 150 mm. in the presence of an inert gas, at a liquid hourly space velocity of about 0.5 in a ten-minute duration run in fixed bed operation.

To further characterize this catalytic material, it has a surface area in the "H" form of 300 m.²/gm. and above.

It is thermally stable upon repeated exposure (e.g. regenerations) to temperatures of the order of 600° C. (1,110° F.) and even up to about 800° C. (1470° F.) under certain conditions.

Summarizing these properties, when the term "catalyst of the acid-activated mordenite type" is used hereinafter, that term refers to a material:

(1) Having an atomic ratio Si/Al of about 5/1.
(2) Having the crystalline structure of mordenite as shown by powder X-ray diffraction.
(3) Having the acid or "H" form, or not more than about 50% as a partial salt thereof.
(4) Having a surface area of at least 300 m.²/gm.
(5) Thermally stable.
(6) Capable of converting hexane to the extent of about 20 weight percent at a temperature of 240° C. and a partial pressure of about 150 mm. in the presence of an inert gas, at a liquid hourly space velocity of about 0.5 in a run of ten minutes duration in a fixed bed operation.

HYDROCARBON CRACKING

As an example of the high and unexpected capability of this catalyst of the acid-activated mordenite type, reference is made to the conversion of normal hexane. In the presence of a conventional type of silica-alumina catalyst, amorphous in nature, of an activity index of 46, hexane is stable until temperatures of the order of 500° C. (930° F.) are reached.

In contrast, when passed in contact with the present catalyst, hexane undergoes substantial conversion at 240° C. (435° F.), in a low concentration in inert gas carrier.

While it is known that crystalline alumino-silicates are more active than the amorphous forms, the present catalyst is more active than the usual crystalline alumino-silicates. In contrast to the substantial conversion of hexane at 240° C. (435° F.) noted above for this catalyst, the "acid" form of the Y variety of faujasite does not exhibit conversion of hexane until temperatures of about 330° C. (625° F.) are reached.

A further notable characteristic of the conversion of paraffinic materials over this catalyst is the nature of the products of conversion. With hexane charge, there are no $C_4$ olefins or lower olefins produced, the effluent products being saturated, and a substantial portion of those products—form 40–60% of them—being isobutane and isopentane. Some isohexane also may be produced. Also notable is the fact that "dry" gas, that is, methane and ethane, is not produced in detectable quantities.

This conversion, in the production of iso-compounds, the absence of methane and ethane, the indicated ability for hydrogen transfer, resembles the conversions accomplished over catalysts of the type of $AlCl_3$ rather than those usually associated with silica-alumina catalysts.

At higher temperatures, the product distribution changes. With hexane charge, at about 410° C. (770° F.), hexane is highly converted, and olefins, toluene, and benzene appear in the product. The appearance of aromatics indicates a reforming capability of this catalyst, and that at a temperature about 100° C. lower than those usually utilized for reforming over platinum catalysts.

Conversion of normal heptane over this catalyst behaves similarly, except that conversion sets in at the lower temperature of 180° C. (355° F.), and aromatic compounds appear in the products of conversion at temperatures of about 300° C. (575° F.), heptane being almost wholly converted at temperatures of about 320° C. (610° F.).

It will be realized from the above data that this catalyst presents a unique utility not only for the cracking of normal petroleum fractions, but for the "reforming" of naphthas of low anti-knock capability to produce products of higher anti-knock value. The "$C_6$ cut" of normally produced gasolines, composed mainly of hexane, but also containing significant quantities of pentane and heptane is ordinarily considered a somewhat difficult thing to handle in upgrading and in some cases resort is had to very high temperature thermal cracking to destroy it with the production of ethylene, propylene, and other fragments which then may be tailored into effective anti-knock components or diverted into profit channels other than gasoline.

With this present catalyst, this fraction can be converted to desirable product at relatively low temperatures.

For example, in a fixed bed operation conducted at temperatures of the order of 400–420° C. (750–800° F.), at a space velocity of the order of 0.5 (liquid volume charge at 20° C./volume occupied by catalyst, at a partial pressure of about 150 mm. in the presence of inert gas, and for a 10-minute duration of cracking portion of the cycle, in excess of 50% (weight percent) of a material composed mainly of hexane will be converted to toluene, benzene, iso-compounds, and olefins suitable for alkylation.

The regeneration of this catalyst is readily accomplished with air at temperatures of 300° C. (575° F.), and upwards to about 600° C. (1110° F.).

Thus, the catalyst lends itself readily to any form of cyclic process in which it is alternately exposed to conversion of a charge and to regeneration.

CONVERSION OF CYCLOPARAFFINS

This catalyst of the acid-activated mordenite type is also quite active for the conversion of cycloparaffins, at relatively low temperatures and in the absence of a dehydrogenation component.

For example, in an extended experiment wherein cyclohexane feed, at a partial pressure of about 80 mm. (helium stream saturated with cyclohexane), at a liquid hourly space velocity of about 0.2, and at a temperature of 270° C. (518° F.), the following was observed.

TABLE I

| Minute on stream | Conversion products (wt. percent) methyl-cyclopentane | During that minute | |
|---|---|---|---|
| | | Other | Total |
| 22d | 10.7 | 2.6 | 13.3 |
| 37th | 11.2 | 1.6 | 12.8 |
| 134th | 11.0 | 1.1 | 12.1 |
| 164th | 11.5 | 0.9 | 12.4 |

The continued conversion ability of the catalyst under these conditions is of considerable significance.

In a similarly conducted experiment with methyl cyclohexane at increasing temperatures, the following was noted.

TABLE II

Wt. percent
methylcyclohexane
Temp. ° C.: converted
250° (482° F.) _____ 7.4
320° (608° F.) _____ 29
370° (680° F.) _____ 90

At the highest temperature, the products included dimethylcyclopentanes and aromatics.

BENZENE CONVERSION

It has been found that the catalytic conversion of benzene to other products such as toluene and ethylbenzene can be accomplished at reasonable temperature levels over this catalyst of acid-activated mordenite type.

This is somewhat unusual in that benzene would not normally be considered a compound which would undergo transformation over oxide catalysts. In the usual case, over amorphous catalytic materials composed of silica-alumina complexes, benzene appears to be a relatively quite stable product, as, for example, in the cracking of petroleum hydrocarbons.

Nevertheless, with the present catalyst, the production of alkylaromatics begins with the appearance of toluene in the products of treatment at about 375° C. (689° F.) with ethyl benzene appearing at about 450° C. (846° F.), and in increasing amounts as the temperature is increased, until, in passing over a fixed bed of this catalytic material at a temperature of about 525° C. (977° F), about 16 weight percent of the benzene fed appears as toluene and ethylbenzene.

ALKYLATION OF BENZENE

Alkylation of benzene may be conducted over this catalyst of acid-activated mordenite type at relatively conservative temperature levels, and in vapor phase or liquid phase as appropriate for the temperature conditions used.

For example, in vapor phase, ethylene and benzene may be passed together, with benzene in excess, to produce ethyl benzenes and other alkyl benzenes. With about 2/1 mol proportions of benzene and ethylene, ethyl benzene is produced at about 100° C. and appears in significant quantities beginning at about 150° C. (300° F.) at atmospheric pressure. The amount of benzene converted to alkyl benzenes follows a temperature pattern in accordance with the following.

TABLE III

| Temp. °C: | Wt. percent benzene converted |
|---|---|
| 152 | 4.2 |
| 162 | 4.2 |
| 240 | 6.2 |
| 383 (721° F.) | 14.6 |

In addition to ethyl benzene, and particularly at the higher temperatures, the effluent was found to contain diethyl benzene, o-xylene, cumene, and some toluene.

The above experiments were carried out with a stream of helium as carrier gas, saturated with benzene at atmospheric temperature and pressure, to which the desired amount of ethylene had been added.

Similarly, but in liquid phase, alkylation of benzene with propylene is found to proceed readily in liquid phase at temperatures of about 78° C. (175° F.) with the production of cumene. Benzene was provided in excess. The catalyst used was the dried powder form, slurried into the reaction mixture, this mixture being gotten by flowing propylene in vapor form into a body of benzene. The rate of production of cumene was found to be about 0.84 mmols cumene/hour/gram of catalyst at 78° C.

TOLUENE DISPROPORTIONATION

This catalyst of the acid-activated mordenite type exhibits a high capability for the disproportionation of toluene, as shown by the following data.

TABLE IV

Disproportionation of toluene at 300° C. (572° F.)

| Minute on stream: | Conversion during that period, wt. percent |
|---|---|
| 24–27 incl. | 47.3 |
| 62–68 incl. | 46.4 |
| 73–77 incl. | 38.6 |
| 91st | 33.0 |
| 120th | 30.0 |
| 170th | 24.3 |

The liquid hourly space velocity of this operation was about .04, at a toluene partial pressure of about 20 mm. in a stream of helium carrier gas. The products were mainly xylenes and benzene, and no evidence of light fragments was detected.

In contrast, passing toluene over an amorphous silica-alumina catalyst of 46 Activity index, only about 2% conversion can be had at 546° C. (1013° F.).

INTERCEPTION OF CRACKING BY ALKYLATION

It was noted earlier in this specification that, while the cracking of paraffins at lower temperatures over this catalyst of acid-activated mordenite type did not give rise to olefins, at higher temperatures, olefins were formed. It has also been noted that alkylation of benzene with olefins is possible at relatively low temperatures over this catalyst.

This combination of capabilities gives rise to an interesting conversion, wherein a paraffin, such as heptane is cracked over this catalyst at conversion temperatures in the presence of an alkylatable material such as benzene.

The course of such treatment with temperature is shown by the following:

TABLE V.—N-HEPTANE CRACKING IN PRESENCE OF BENZENE

| Temp., °C. | Benzene conv., wt. percent | Heptane conv., wt. percent | |
|---|---|---|---|
| 130 | 0 | 7 | Cracked products. |
| 172 | 0 | 21 | Do. |
| 275 | 3.6 | 47 | Do. |
| 331 | 6.1 | 92 | Cracked products plus toluene, ethyl benzene, oxylene. |
| 360 (680° F.) | 21.0 | 95 | Cracked products plus toluene, xylene, diethylbenzene. |

From the above, it will be noted that a very substantial conversion of the type noted occurs. This is particularly significant when considering the capability of this catalyst for reforming type operations, particularly noting that according to Table III, with benzene present, the formation of alkyl benzenes becomes significant at temperatures of the order of 150° C.

OLEFIN POLYMERIZATION

This catalyst of the acid activated mordenite type has also been found to be quite active for the polymerization of olefins. For example, passing ethylene over this catalyst at temperatures of around 200° C. (392° F.) gives rise to an oily polymer liquid and some ethane, but little $C_3$ to $C^6$ hydrocarbons.

This polymerization of olefins occurs over a wide temperature range, beginning at temperatures of the order of ambient temperatures.

From the above summary of various, it is evident that this catalyst of the acid-activated mordenite type possesses quite interesting, unusual, and very significant capabiilties.

What is claimed is:

1. An improved process for isomerizing naphthenic hydrocarbons which comprises subjecting said naphthenic hydrocarbons to isomerization conditions in the presence of a catalyst comprising a crystalline mordenite zeolite.

2. The process of claim 1, wherein said mordenite zeolite has been base exchanged with a hydrogen-containing cation.

3. The process of claim 1, wherein said isomerization conditions include a temperature within the range of about 350° to about 800° F., a pressure within the range of about 0 to about 1000 p.s.i.g., and a catalyst charge within the range of about 0.2 to about 5 volumes of feed per volume of catalyst per hour of reaction time, said conditions being selected to maintain the proportion of cracked products below about 20 wt. percent, based on feed.

4. The process of claim 1, wherein said naphthenic hydrocarbons comprise cyclohexane.

5. An improved process for isomerizing naphthenic hydrocarbons which comprises subjecting a feed containing said naphthenic hydrocarbons to isomerization conditions in the presence of a catalyst comprising a crystalline mordenite zeolite having a silica to alumina mole ratio of about 9 to 11 and containing less than about 5.0 wt. percent $Na_2O$.

6. The process of claim 5, wherein said mordenite zeolite has been subjected to base exchange with a hydrogen-containing cation to reduce its $Na_2O$ content.

7. The process of claim 5, wherein said isomerization conditions include a temperature of about 400° to 600° F., and a pressure of about 0 to 400 p.s.i.g., and wherein the proportion of cracked products is maintained below about 20 wt. percent, based on feed.

8. An improved process for isomerizing naphthenic hydrocarbons which comprises subjecting said naphthenic hydrocarbons to isomerization conditions in the presence of a catalyst comprising a crystalline synthetic mordenite zeolite.

9. The process of claim 8, wherein said mordenite zeolite has been base exchanged with a hydrogen-containing cation.

10. The process of claim 8 wherein said isomerization conditions include a temperature within the range of about 350° to about 800° F., a pressure within the range of about 0 to about 1000 p.s.i.g., and a catalyst charge within the range of about 0.2 to about 5 volumes of feed per volume of catalyst per hour of reaction time, said conditions being selected to maintain the proportion of cracked products below about 20 wt. percent, based on feed.

11. The process of claim 8, wherein said naphthenic hydrocarbons comprise cyclohexane.

12. An improved process for isomerizing naphthenic hydrocarbons which comprises subjecting a feed containing said naphthenic hydrocarbons to isomerization conditions in the presence of a catalyst comprising a crystalline synthetic mordenite zeolite having a silica to alumina mole ratio of about 9 to 11 and containing less than about 5.0 wt. percent $Na_2O$.

13. The process of claim 12, wherein said mordenite zeolite has been subjected to base exchange with a hydrogen-containing cation to reduce its $Na_2O$ content.

14. The process of claim 12, wherein said isomerization conditions include a temperature of about 400° to 600° F., and a pressure of about 0 to 400 p.s.i.g., and wherein the proportion of cracked products is maintained below about 20 wt. percent, based on feed.

References Cited
UNITED STATES PATENTS

| | | | |
|---|---|---|---|
| 2,971,904 | 2/1961 | Gladrow et al. | 260—676 |
| 3,069,482 | 12/1962 | Fleck | 260—666 |
| 3,190,939 | 6/1965 | Benesi | 260—683.65 |
| 3,299,153 | 1/1967 | Adams et al. | 260—666 |

DELBERT E. GANTZ, Primary Examiner

V. O'KEEFE, Assistant Examiner

U.S. Cl. X.R.

260—676